United States Patent Office 3,096,374
Patented July 2, 1963

3,096,374
NEW CARBOXYLIC ACID AMIDES SUBSTITUTED AT THE NITROGEN ATOM AND β-CARBON ATOM AND PROCESS FOR THEIR MANUFACTURE
Gustav Ehrhart, Bad Soden, Taunus, Ingeborg Hennig, Kelkheim, Taunus, Ernst Lindner, Frankfurt am Main, and Heinrich Ott, Eppstein, Taunus, Germany, assignors to Farbwerke Hoechst Aktiengesellschaft vormals Meister Lucius & Brüning, Frankfurt am Main, Germany, a corporation of Germany
No Drawing. Filed Oct. 29, 1957, Ser. No. 693,016
Claims priority, application Germany Nov. 6, 1956
1 Claim. (Cl. 260—562)

The unsubstituted β-hydroxy-butyric acid amide is described in Helv. Chim. Acta 8 (1925), page 393. Furthermore for example, the β-hydroxy-β-phenyl-propionic acid diethyl amide is known as insect repellent from J. Am. Chem. Soc. 70 (1948), pages 677 and 75 (1953), page 2416.

The present invention relates to carboxylic acid amides substituted at the nitrogen atom and β-carbon atom of the general formula

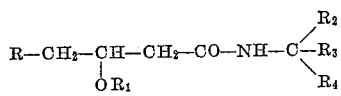

wherein R represents hydrogen, methyl or ethyl, $R_1$ hydrogen or an aliphatic acyl radical containing at most 4 carbon atoms, $R_2$, $R_3$ and $R_4$ each an alkyl radical containing at most 3 carbon atoms, and $R_4$ may also stand for a phenyl radical.

Now it has been found that the compounds of the above formula are valuable analgetics which can be obtained in a good yield according to processes generally used for the preparation of carboxylic acid amides.

The reaction of β-hydroxy- or β-acyloxy-carboxylic acids or their functional derivatives with the amines corresponding to the above formula, whereby the desired carboxylic acid amides can for example be obtained, is carried out according to known methods. As β-hydroxycarboxylic acids are mentioned for example: β-hydroxybutyric acid, -valeric acid and -caproic acid. As β-acyloxy-carboxylic acids are concerned for example: β-acetoxy-butyric acid, -valeric acid and -caproic acid, β-propionyloxy-butyric acid, -valeric acid, and -caproic acid, β-butyryloxy-butyric acid, -valeric acid and -caproic acid. According to the process of the present invention there are used with special advantage the low alkyl or phenyl esters of these acids which are reacted with the corresponding amines. The reaction is effected in the usual manner by prolonged heating of both components, if necessary in the autoclave. As amines may be used for example: tert. butylamine-(1), 1,1-dimethyl-n-propylamine-(1), 1-methyl-1-ethyl-n-propylamine-(1), 1,1-diethyl-n-propylamine-(1), 1,1-dimethyl-n-butylamine-(1), 1-methyl-1-ethyl-n-butylamine-(1), 1,1-diethyl-n-butylamine-(1), 1,1-di-n-propyl-n-butylamine-(1), 1-methyl-1-phenyl-n-propylamine-(1), 1-methyl-1-phenyl-n-butylamine-(1), 1-ethyl-1-phenyl-n-butylamine-(1). Naturally, there are also concerned other combinations of alkyl radicals with 1 to 3 carbon atoms, of which one may also be replaced by phenyl, provided there is always used an amine carrying a tertiary alkyl radical.

An advantageous process starting from functional derivatives of the β-hydroxy-carboxylic acids is carried out by reacting β-hydroxy-carboxylic acid halides, preferably the corresponding acid chlorides or acid bromides of the β-hydroxy-carboxylic acids, whose hydroxyl group is suitably substituted by an acyl radical, with the above-mentioned amines. For the preparation of β-hydroxy-carboxylic acid amides with a free hydroxyl group, the latter can be protected during the reaction by a radical that is easily split off. Upon termination of the reaction, this protective group is split off in the usual manner, for example by hydrolyzation with dilute alkalies or acids. This reaction is suitably carried out in an inert solvent, for example ether, benzene, toluene, methylene chloride or chloroform, in the presence of an agent splitting off hydrogen halide and, generally, it is already successful in the cold. It is of particular advantage to use as agent splitting off hydrogen halide a second mol of the amine used for the reaction. The hydrogen halide of the amine that has separated can directly be filtered off with suction or be removed by shaking with water.

When preparing the products of the present invention it is of particular advantage to use the reduction of the β-keto-carboxylic acid amides. As such there may be mentioned for example: acetoacetic acid amides, β-keto-valeric acid amides and β-keto-caproic acid amides. By amides there are meant such compounds as contain the above mentioned amines as amide components in the acid amide group.

The preparation of the β-keto-carboxylic acid alkyl amides can, for example, be carried out in the following manner. Acetoacetic acid alkyl amides that are easily accessible from diketen and from the aforementioned amines are reacted with an unbranched aliphatic carboxylic acid halide containing 3–4 carbon atoms in the presence of an agent splitting off hydrogen halide. The α-acetyl group can be eliminated by means of dilute acids or alkali hydroxide solutions, preferably by methanol and dilute hydrochloric acid, from the diketo compounds formed, whereby β-keto-carboxylic acid alkyl amides with at least 5 to 6 carbon atoms in the carboxylic acid radical are obtained. The reaction takes place according to the following reaction scheme:

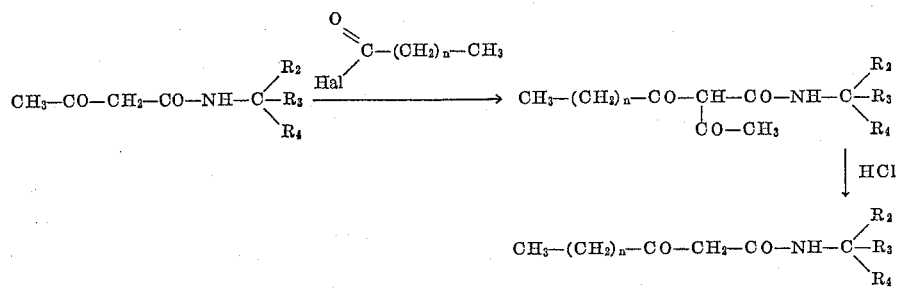

wherein $R_2$, $R_3$ and $R_4$ have the signification indicated above and $n$ stands for 1 or 2.

Of the aliphatic acid halides suitable for the reaction there may, for example, be mentioned: propionyl chloride and butyryl chloride. As agents splitting off halogen there are suitable alkali metal and alkaline earth metal oxides or hydroxides, carbonates and bicarbonates. Calcium oxide is preferably used. The reaction may also be carried out in the presence of organic bases. The operation is suitably carried out in indifferent organic solvents in which the inorganic agents splitting off hydrogen halide are suspended. As such solvents there are particularly concerned for example: methylene chloride, ethylene chloride, chloroform, benzene and toluene. The aliphatic acid chloride is added dropwise, while stirring, to the suspension. In most cases the reaction takes an exothermic course. Upon termination of the reaction, the reaction mixture is made weakly acid, the inorganic salt is filtered off with suction and the reaction product is obtained by concentration of the filtrate or it is filtered off with suction in the form of its alkali metal salt together with the inorganic salts without previous acidification and is isolated from this mixture by appropriate measures (for example acidification and extraction with an organic solvent). The acetyl group is easily split off, for example by heating for about 30 minutes with a mixture of dilute hydrochloric acid and a low molecular alcohol, preferably methanol. The isolation is effected by dilution and subsequent extraction with a suitable solvent. From the latter the β-keto-carboxylic acid amides can be isolated in the usual manner, for example by distillation under reduced pressure. The β-keto-carboxylic acid alkyl amides obtained according to this process in a good yield can then be reduced in known manner to form the β-hydroxy-carboxylic acid alkyl amides. The reduction of the keto group can, for example, be effected catalytically with the aid of metals of the 8th group of the Periodic System, preferably nickel catalysts, in the presence of customary solvents such as aqueous alcohols, alcohols or water. Noble metals or Raney catalysts may also be used. It is also possible to reduce by means of nascent hydrogen, for example with aluminum amalgam and alcohol, sodium amalgam, lithium aluminum hydride or sodium boron hydride. The reaction may also be carried out electrolytically.

Furthermore, β-hydroxy-carboxylic acid amides can be prepared according to the invention from the β-amino-carboxylic acid amides which are obtained according to the usual methods. To these β-amino-carboxylic acid amides with the desired substituents at the amide nitrogen atom is added dropwise, while stirring and, if necessary, while cooling, in the presence of a dilute mineral acid, preferably hydrochloric or sulfuric acid, the equimolar quantity of a concentrated aqueous solution of an alkali metal nitrite, preferably sodium nitrite. The evolution of nitrogen indicating the transformation of the amino group into the hydroxy group generally commences when heating to room temperature. The reaction mixture is stirred for some time at room temperature, if necessary at moderately elevated temperatures (for example in the steam bath) until the evolution of gas has ceased and thus the transformation of the amino group into the hydroxy group is complete.

As starting compound there is likewise suitable the β-butyrolactone that can be prepared according to known processes, for example by catalytic hydrogenation of diketen. By reaction with the said monoalkylamines the said β-hydroxy-butyric acid amides are directly obtained. This reaction takes place by the action of the two components in the presence or absence of solvents, for example water or organic solvents such as alcohols, benzene, toluene or ethers. Usually, the reaction sets in spontaneously and the reaction products can be isolated from the reaction mixture by fractional distillation or by crystallization.

For the preparation of the β-acyloxy-carboxylic acid amides, unless these are obtained directly by synthesis, the carboxylic acid amides containing a free β-hydroxyl group can be acylated in known manner while operating for example with halides or anhydrides of low molecular carboxylic acids under the usual acylation conditions.

The products of the present invention are valuable medicaments and have favourable therapeutic properties, while showing a very low toxicity. They show in particular a surprisingly good analgesic efficiency.

The analgesic efficiency was tested according to the Wolff-Hardy and Goodell method by exposing mice to heat until they showed a defensive reflex. At first the normal reaction time was determined. In the control test a group of 60 mice showed the defensive reflex after an average time of 7.2 seconds. When having injected subcutaneously 250 mg./kg. of β-hydroxy-butyric acid -[1-phenyl-1-ethyl-propyl-(1)]- amide the maximum extension of the reaction time was reached 60 minutes after the injection. The following table indicates for the individual products of the present invention the dosage required for producing analgesia. The average extension of the reaction time in the treated 20 mice amounted to 25.3 seconds.

TABLE I

| No. | Compound | Dose required for producing analgesia, mg./kg. subcutaneously |
|---|---|---|
| 1 | β-hydroxy-butyric acid tert. butylamide | 750 |
| 2 | β-hydroxy-butyric acid-[1-phenyl-1-ethyl-propyl-(1)]-amide | 250 |
| 3 | β-hydroxy-butyric acid-[1,1-diethyl-propyl-(1)] amide | 250 |

The low toxicity of the products of the invention is of special importance for their use as medicaments. The following table indicates for example the minimum lethal dose for some products of the invention after intravenous administration.

TABLE II

| No. | Compound | Minimum lethal dose intravenously |
|---|---|---|
| 1 | β-hydroxy-butyric acid tert. butylamide | 1.5 g./kg. |
| 2 | β-hydroxy-butyric acid[1-phenyl-1-ethyl-propyl-(1)]amide | 150 mg./kg. |
| 3 | β-hydroxy-butyric acid-[1,1-diethyl-propyl-(1)] amide | 350 mg./kg. |

The products of the present invention may be administered per os as well as parenterally. They can be worked up to medicinal preparations, for example, to tablets or injection solutions. When preparing tablets there are added the usual carrier substances such as lactose, starch, tragacanth and magnesium stearate.

The following examples serve to illustrate the invention but they are not intended to limit it thereto.

*Example 1*

β-HYDROXY-BUTYRIC ACID-TERT.BUTYLAMIDE

Acetoacetic acid tert. butylamide prepared from equivalent quantities of tert.butylamine and diketen in water is dissolved in methanol and hydrogenated at 60–70° C. in the presence of Raney nickel. After filtration and concentration of the filtrate the oily residue is distilled. There is obtained β-hydroxy-butyric acid tert.butylamide boiling at 102° C. under a pressure of 0.45 mm. Hg. The melting point amounts to 88–89° C. (after recrystallization from ethyl acetate).

*Example 2*

β-HYDROXY-BUTYRIC ACID-[1-PHENYL-1-ETHYL-PROPYL-(1)]-AMIDE 40 grams of 1-phenyl-1-ethyl-propyl-(1)-amine are reacted with the equivalent quantity of diketen as is described in Example 1. There are obtained 40 grams of acetoacetic acid (1-phenyl-1 - ethyl) - propyl - (1) - amide melting at 91–92° C. (from ethyl acetate/petroleum ether) which are hydrogenated in methanol at 80° C. in the presence of Raney nickel. After filtration and concentration of the filtrate, the residue being at first oily crystallizes from ethyl acetate/petroleum ether. 35 grams of β-hydroxy-butyric acid-[1-phenyl-1 - ethyl - propyl-(1)]-amide melting at 79–80° C. are obtained.

Example 3

β-HYDROXY-BUTYRIC ACID-[1-PHENYL-1-ETHYL-PROPYL-(1)]-AMIDE

To a solution of 50 grams of acetoacetic acid-[1-phenyl-1-ethyl-propyl-(1)] amide in 150 cc. of methanol are added 50 cc. of water and then in portions 2.5 grams of sodium boron hydride. After the exothermic reaction has subsided, the methanol is distilled off and the solution diluted with water is extracted by means of methylene chloride. After drying and distilling off the solvent the resulting viscous oil (53 grams) is made to crystallize by means of ethyl acetate/petroleum ether. 46 grams of β-hydroxy-butyric acid-[1-phenyl-1-ethyl-propyl-(1)]-amide melting at 79° C. are obtained.

The reduction may also be effected in such a way that the starting compound is dissolved in five times the quantity of 2 N-sodium hydroxide solution and sodium boron hydride is then added to this solution. Upon termination of the reaction an oil separates from the aqueous solution; the oil is taken up in methylene chloride and worked up as described above.

Example 4

β-HYDROXY-BUTYRIC ACID-TERT.BUTYLAMIDE

To a solution of 6 grams of β-amino-butyric acid tert. butylamide in 40 cc. of 2 N-hydrochloric acid is added, while cooling with ice and while stirring, a concentrated aqueous solution of 2.8 grams sodium nitrate. When all of the solution has been added, the ice is removed and the reaction mixture is stirred at first at room temperature and then on the steam bath until the evolution of gas has ceased. The clear solution is concentrated and then extracted with chloroform. Upon drying and evaporation of the solvent the residue being at first oily crystallizes. After recrystallization from ethyl acetate there are obtained 4 grams of β-hydroxy-butyric acid tert.butyl-amide melting at 88° C.

Example 5

β-HYDROXY-BUTYRIC ACID-TERT.BUTYLAMIDE

To a solution of 9 grams of β-butyrolactone in 30 cc. of ether is added, while cooling, a solution of 8 grams of tert.butylamine in 30 cc. of ether. The mixture is allowed to stand for 24 hours at room temperature. After distilling off the solvent and the unreacted reagents, the residue solidifies. There are obtained 10 grams of β-hydroxy-butyric acid tert.butylamide melting at 87° C.

Example 6

β-HYDROXY-BUTYRIC ACID-[1,1-DIETHYL-PROPYL-(1)]-AMIDE 33 grams of acetoacetic acid [1,1-diethyl-propyl-(1)]-amide melting at 96–97° C., which are obtained from equivalent quantities of 1,1-diethyl-propyl-(1)-amine and diketen in benzene, are dissolved in 100 cc. of methanol and 20 cc. of water. To this solution are added in portions 1.9 grams of sodium boron hydride. After the exothermic reaction has subsided, the methanol is distilled off under reduced pressure. After extracting the residue with ether and washing the ethereal solution with dilute hydrochloric acid, the ether residue crystallizes. 28 grams of β-hydroxy-butyric acid-[1,1-diethyl-propyl-(1)] amide melting at 67–68° C. are obtained (from cyclohexane).

Example 7

β-ACETOXY-BUTYRIC ACID-TERT.BUTYLAMIDE 30 grams of β-hydroxy-butyric acid-tert.butyl-amide are boiled for one hour under reflux with 100 cc. of acetic anhydride. After concentration under reduced pressure, the oily residue is taken up in ether and washed with sodium carbonate solution until a neutral reaction is obtained. After drying and distilling off the ether, the residue solidifies. On recrystallization from cyclohexane there are obtained 23 grams of β-acetoxy-butyric acid-tert.butylamide melting at 66–67° C.

Example 8

β-HYDROXY-CAPROIC ACID-TERT.BUTYLAMIDE 35 grams of butyric acid chloride are added dropwise to a solution of 52 grams of acetoacetic acid-tert. butylamide in 200 cc. of methylene chloride in which 50 grams of calcium oxide are suspended. The vigorous reaction which soon sets in is conducted in such a way by slow and dropwise addition of butyryl chloride that the methylene chloride keeps boiling. After stirring for one hour, the reaction mixture is acidified with 2 N-hydrochloric acid, the methylene chloride solution is separated and washed with sodium bicarbonate solution until a neutral reaction is obtained. After drying and distilling off the solvent, the residue solidifies. After recrystallization from cyclohexane there are obtained 27 grams of α-acetyl-β-keto-caproic acid-tert. butylamide melting at 95–96° C. 14 grams of this compound are boiled for 30 minutes under reflux with 30 cc. of methanol and 3 cc. of 1 N-hydrochloric acid. After dilution with water, the reaction mixture is neutralized with dilute sodium bicarbonate solution and extracted with ether. After drying and distilling off the ether, there are obtained 10 grams of oil β-keto-caproic acid-tert. butylamide.

These 10 grams are dissolved in 50 cc. of methanol and 10 cc. of water and to this solution is added in portions, while stirring, 1 gram of sodium boron hydride. After concentration, water is added to the reaction solution which is then extracted with ether. After washing with dilute hydrochloric acid the ethereal solution is dried and the ether is distilled off. The residue (8 grams) crystallizes on trituration with ethyl acetate. After recrystallization from ethyl acetate there is obtained the β-hydroxy-caproic acid tert. butylamide melting at 60–61° C.

Example 9

β-HYDROXY-BUTYRIC ACID TERT.BUTYLAMIDE

To a solution of 20 grams of β-acetoxy-butyric acid chloride boiling at 85–90° C. under a pressure of 18 mm. of mercury (prepared from β-acetoxy-butyric acid and thionyl chloride) in 60 cc. of ether is slowly added dropwise, while stirring and cooling, a solution of 22 grams of tert. butylamine in 60 cc. of ether. After the precipitated tert. butylamine hydrochloride has been filtered off with suction, the filtrate is washed once with water. After drying and distilling off the ether, the residue crystallises. After recrystallisation from cyclohexane there are obtained 23 grams of β-acetoxy-butyric acid-tert. butylamide melting at 66–67° C.

5 grams of this compound are heated for one hour with 35 cc. of 2 N-hydrochloric acid on the steam bath. After addition of solid potassium carbonate until saturation is achieved, the oil that has formed is taken up in ether. After drying and distilling off the ether, the residue crystallises. After recrystallisation from ethyl acetate the β-hydroxy-butyric acid-tert. butylamide melts at 88–89° C.

We claim:

β-Hydroxy-butyric acid-[1-phenyl-1-ethylpropyl-(1)]-amide.

References Cited in the file of this patent

UNITED STATES PATENTS

| | | |
|---|---|---|
| 2,545,044 | Reynolds et al. | Mar. 13, 1951 |
| 2,571,755 | Pfister et al. | Oct. 16, 1951 |
| 2,601,387 | Gresham et al. | June 24, 1952 |
| 2,702,822 | Weisgerber | Feb. 22, 1955 |
| 2,742,397 | Ott | Apr. 17, 1956 |
| 2,749,355 | Jones | June 5, 1956 |
| 2,855,342 | Wagner et al. | Oct. 7, 1958 |

FOREIGN PATENTS

| | | |
|---|---|---|
| 943,459 | France | Oct. 4, 1948 |
| 457,379 | Canada | June 14, 1949 |
| 534,052 | Canada | Dec. 4, 1956 |